UNITED STATES PATENT OFFICE.

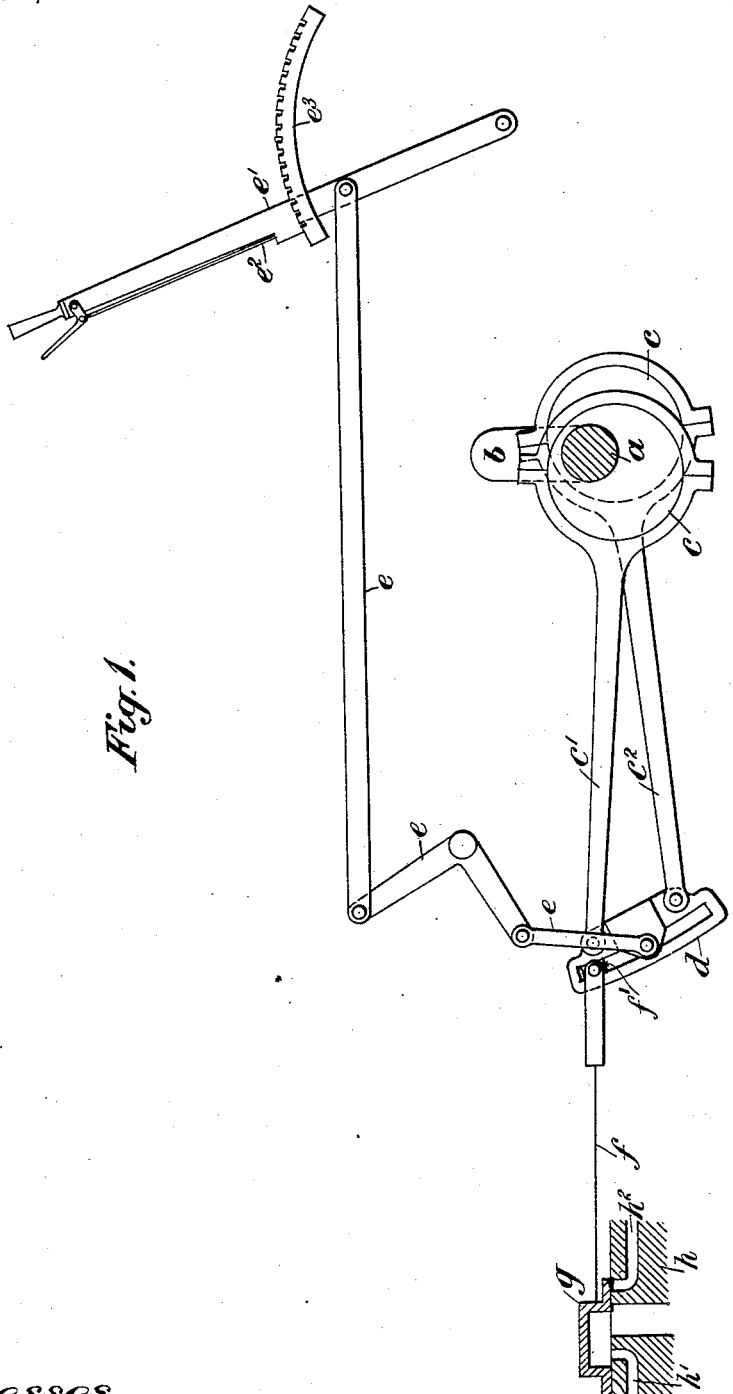

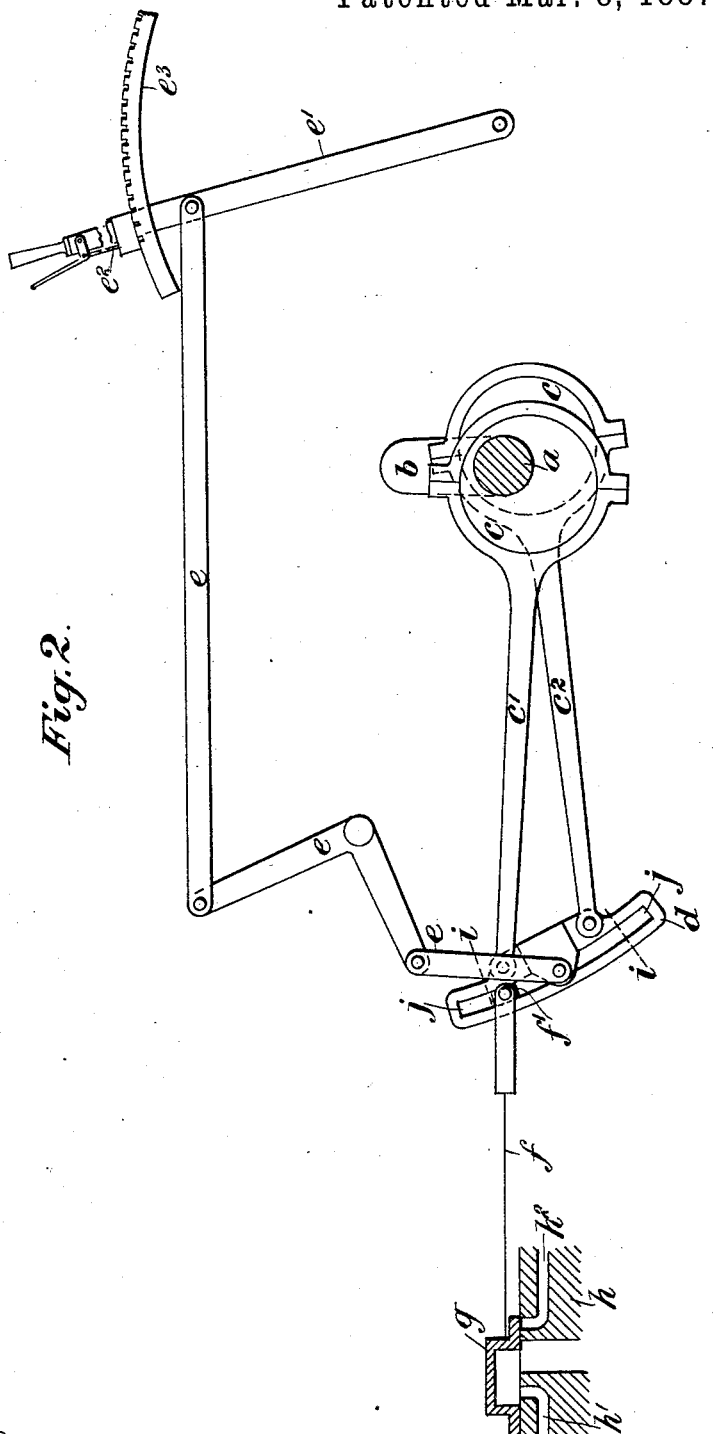

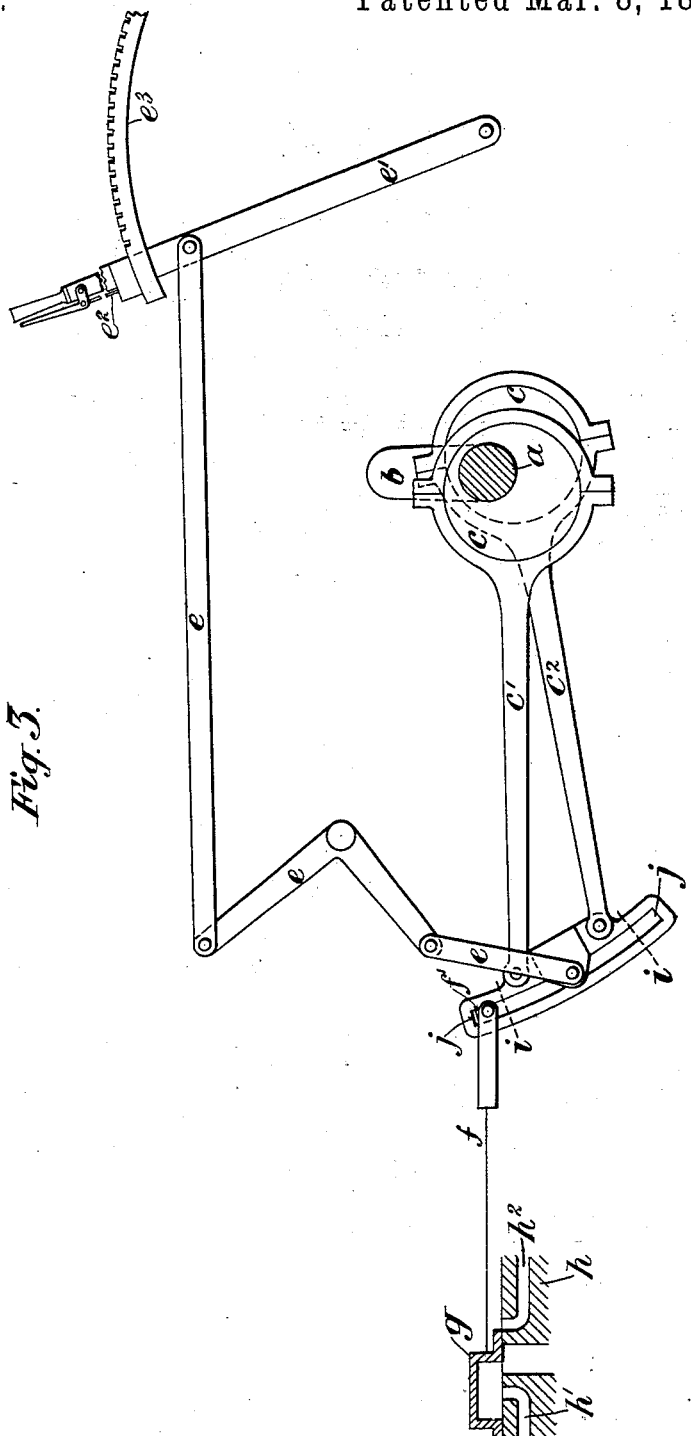

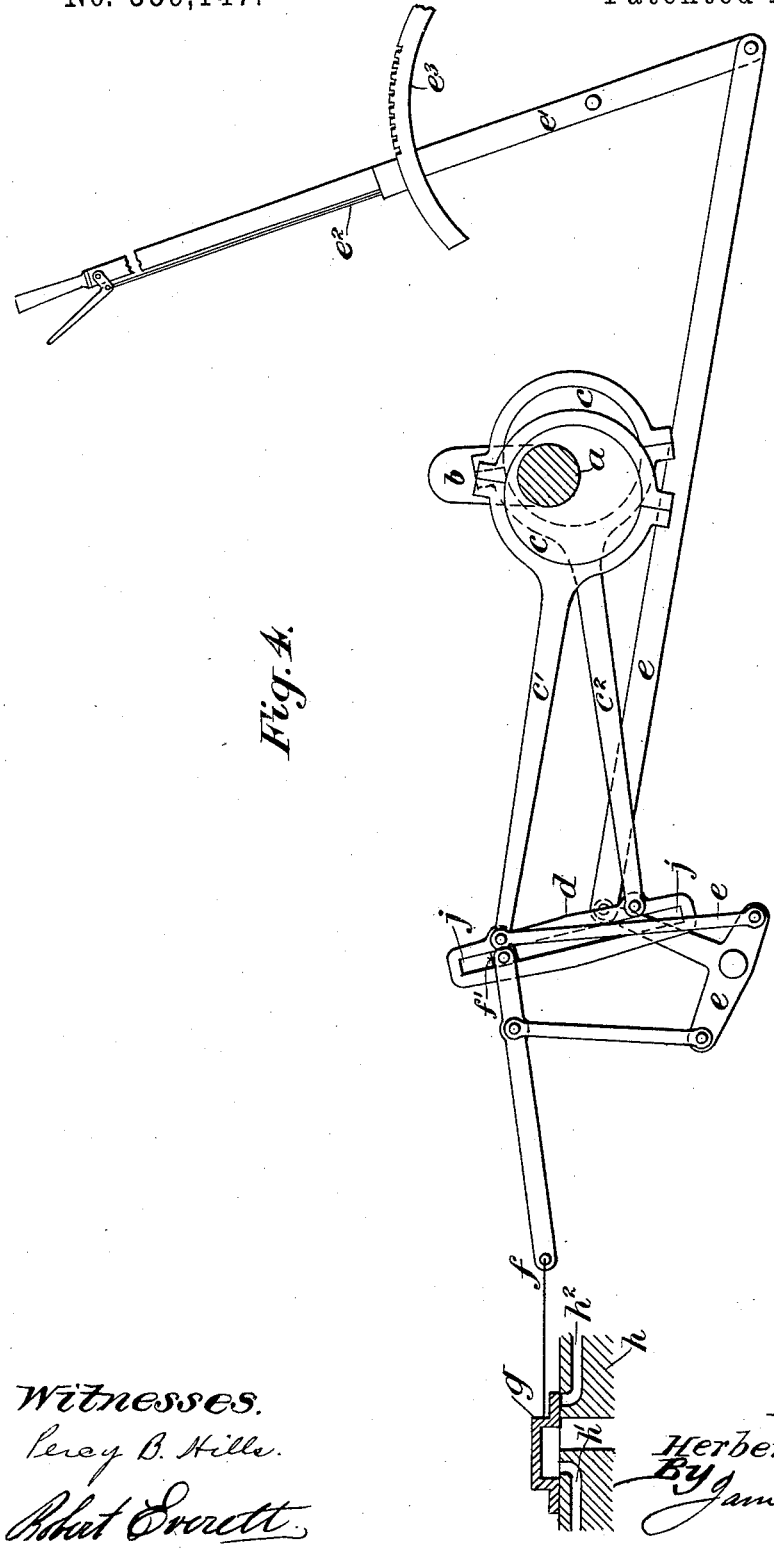

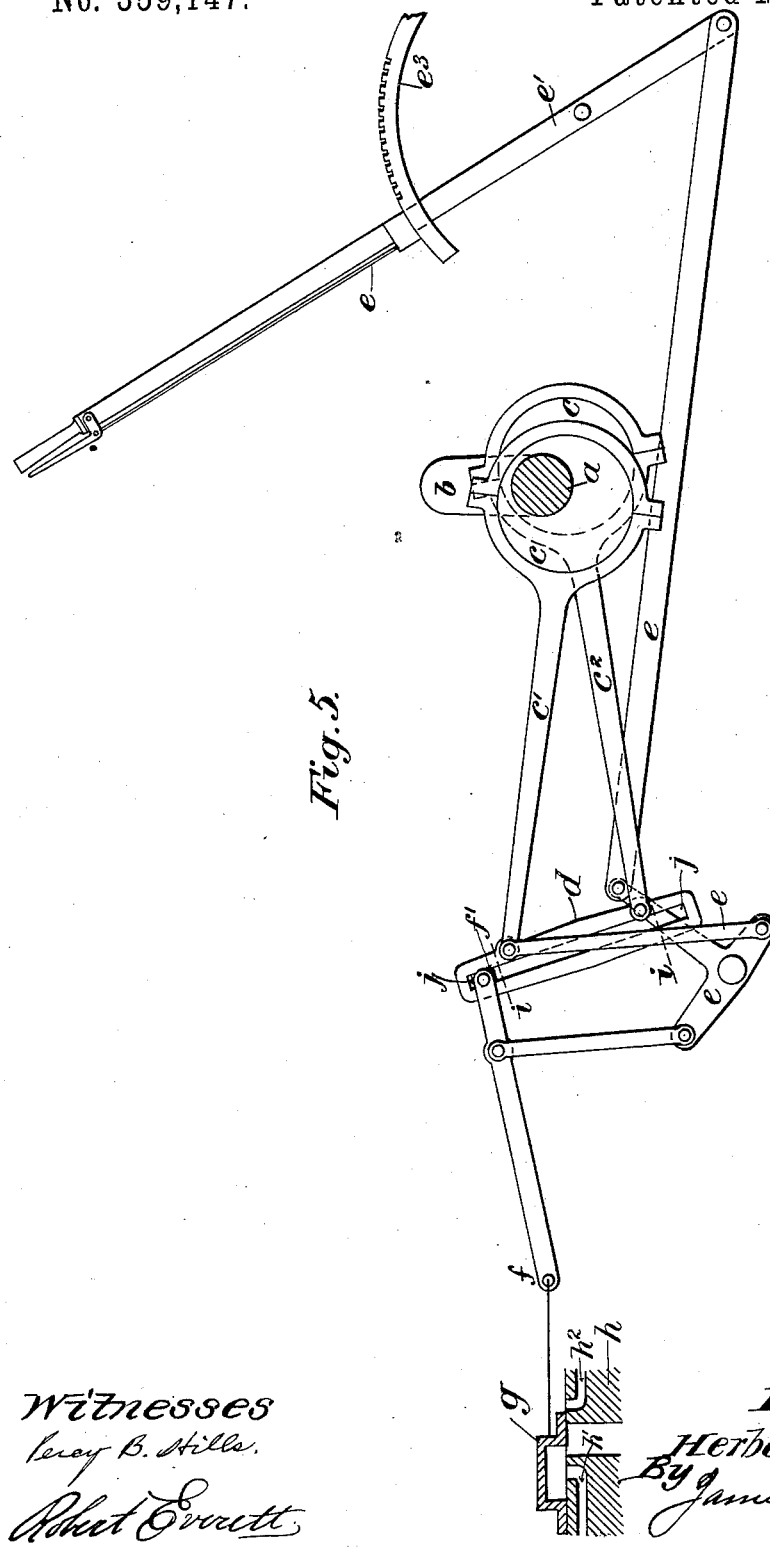

HERBERT WILLIAM GARRATT, OF LOWER CLAPTON, COUNTY OF MIDDLESEX, ENGLAND.

VALVE-GEAR.

SPECIFICATION forming part of Letters Patent No. 359,147, dated March 8, 1887.

Application filed September 1, 1886. Serial No. 212,394. (No model.) Patented in England November 14, 1885, No. 13,957.

*To all whom it may concern:*

Be it known that I, HERBERT WILLIAM GARRATT, of Lower Clapton, in the county of Middlesex, England, a subject of the Queen of Great Britain, have invented an Improvement in the Expansion-Links of the Valve-Gear of Locomotive and other Steam-Engines, (for which I have made application for Letters Patent in Great Britain, No. 13,936, dated the 14th day of November, 1885,) of which the following is a specification.

My invention consists of the improvement hereinafter described in the expansion or shifting links of the valve-gear of locomotive and other steam-engines, the object of my said improvement being to overcome the difficulty or objection which attends the use of steam-engines provided with slide-valves having so much "lap" that when the cranks are in certain positions steam cannot take effect in one cylinder, and the steam-ports of the other cylinder are both closed, so that steam cannot pass to either side of the piston, the said difficulty or objection being that when the engine has been stopped with the cranks in such positions it is ineffective or "blind," and cannot be readily started again.

According to my said invention I lengthen the expansion-link and the slot thereof at each end, so as to admit of the said link being raised and lowered beyond the maximum traverse of links as heretofore made—*i. e.*, beyond the points to which it is necessary to raise or lower the link in order to put the engine into full forward or full backward gear—the extent to which I lengthen the said slot being sufficient to cause the valve of the cylinder in which both ports are closed to be moved backward sufficiently to uncover or partially uncover the last closed steam-port on the link being raised or lowered beyond the said points when the engine is blind.

Owing to the difficulty hereinbefore referred to, it has heretofore been impracticable to give as much lap to the slide-valves of steam-engines (especially locomotives) as would otherwise be advantageous, and the said difficulty being overcome by my invention, any desirable amount or extent of lap of the valves is rendered practicable.

My said invention is applicable to the links of all arrangements of valve-gear in which links are used, including the straight link of the arrangement known as "Allan's Motion," the links and the slots thereof being in all cases lengthened at each end to a sufficient extent (according to the amount of lap of the valves) to admit of the links being both lowered and raised beyond the points to which it is necessary to lower or raise them in order to put the engine into full forward or full backward gear.

I will describe my invention with reference to the accompanying drawings and to the letters and figures marked thereon.

The same letters and figures of reference indicate the same parts in each of the figures of the drawings.

Figure 1 of the said drawings is a diagram of the valve-gear of one cylinder of an ordinary locomotive-engine in full gear, the valve having such lap as to cut off at half stroke, and the link being formed as heretofore—that is, of such length that the die-block of the valve-rod is at one or other extremity of the slot in the link when the engine is in full forward or full backward gear. *a* is the crank-shaft. *b* is one of the cranks. *c c* are the eccentrics. $c'$ $c^2$ are the eccentric-rods. *d* is the expansion or shifting link. $e\ e\ e'\ e^2\ e^3$ are the parts constituting the mechanism by which the link *d* is raised and lowered and secured in the required position. *f* is the valve-rod. *f'* is the die-block of the valve-rod engaged in the slot in the link *d*. *g* is the valve. *h* is a portion of the cylinder, and $h'\ h^2$ are the steam-ports thereof.

As will be seen by reference to the said Fig. 1, both ports of the cylinder, in connection with the gear represented, are closed by the valve, and, as will be understood, the piston of the cylinder of the other engine (which is not shown) must be at the extremity of its stroke in one or other direction. Consequently the steam which has access thereto cannot take effect on the piston therein. The engine in this position is therefore ineffective or blind.

Fig. 2 of the accompanying drawings is a diagram corresponding in all respects with Fig. 1, except that in the said Fig. 2 a link to which my improvement is applied is shown, which improvement, as hereinbefore stated, consists in the extension or prolongation of the link and of the slot therein beyond the points necessary to admit of the engine being put into full forward or full backward gear, which points are indicated by the dotted lines marked $i\,i$, those portions of the slot which lie outside of the said dotted lines, and are marked $j\,j$, being the portions which constitute the extension or prolongation hereinbefore referred to.

Valve-gear to the links of which my improvement is applied may be worked by means of the ordinary mechanism, which is shown in the accompanying drawings, and consists of a lever, $e'$, and catch $e^2$, engaging with a notched sector, $e^3$, or by means of the ordinary screw arrangement, or by any other means applicable to the working of the expansion-links of ordinary valve-gear.

I will now describe the method of working the valve-gear of an engine to the expansion-links of which my improvement is applied, and the effect of the said improvement, taking the case of an engine having valves of as great lap as or greater lap than that shown in the said Figs. 2 and 3—that is, having such lap as to cut off the steam at half-stroke or at less than half-stroke in full gear.

When the engine has been stopped with the cranks in such positions that it is ineffective or blind—that is, when one or other of the cranks is at the dead-point, or is so near the dead-point that either the steam is cut off or, owing to a heavy load, the engine cannot be started by merely opening the regulator—the links are lowered or raised beyond the full-gear position, as shown in Fig. 3, and thereby the valve of the cylinder, the piston of which is at half-stroke or nearly half-stroke, is pushed back, or in a direction the reverse of that in which it would be caused to move by the eccentrics if the engines could start and were started in the required direction, the effect being to uncover the steam-port at which steam is required to enter in order to start the engine. When the engine has started in consequence of steam being thus admitted, the links are again lowered or raised to their full-gear position, and may be further lowered or raised, as may be required, in order to increase the extent of the expansive action of the steam, as usual in working expansion-gear provided with links having slots of the ordinary length. Owing to that part of the slot of the other link in which the die-block of the valve-rod of the other cylinder is engaged being vertical or nearly vertical, when it is necessary to raise or lower the links, as hereinbefore described, the position of the valve of that cylinder is not materially altered.

Fig. 3 of the accompanying drawings is a diagram corresponding with Fig. 2, except in respect of the position of the parts, which are shown in the positions they assume when the link is lowered, the die-block of the valve-rod being beyond the full-gear position in the slot in the link, and the valve being consequently pushed back and the last closed part uncovered.

Fig. 4 of the accompanying drawings is a diagram showing the application of my invention to the Allan link-motion, the parts being in the full-gear position; and Fig. 5 of the accompanying drawings is a diagram showing the same arrangement as Fig. 4, but with the link lowered and the valve pushed back, as hereinbefore described with reference to Fig. 3.

Having now particularly described and ascertained the nature of this invention and in what manner the same is to be performed, I declare that I claim—

The valve-gear of steam-engines, consisting of expansion-links having slots of such length that when the engine is blind in full-gear the valve covering the steam-port through which steam is required to pass in order to start the engine may be pushed backward sufficiently to uncover or partially uncover that port by lowering or raising the links beyond the full-gear position.

HERBERT WILLIAM GARRATT.

Witnesses:
WILLIAM THOMAS WHITEMAN,
ALFRED DONNISON.